United States Patent [19]

Van Gorkom et al.

[11] Patent Number: 5,723,940
[45] Date of Patent: Mar. 3, 1998

[54] FLAT-PANEL TYPE PICTURE DISPLAY DEVICE WITH ELECTRON PROPAGATION DUCTS

[75] Inventors: Gerardus G.P. Van Gorkom; Petrus H.F. Trompenaars; Gerardus A.H.M. Vrijssen; Siebe T. De Zwart; Bernardus H.W. Hendriks; Nicolaas Lambert, all of Eindhoven, Netherlands

[73] Assignee: U.S. Philips Corporation, New York, N.Y.

[21] Appl. No.: 471,296

[22] Filed: Jun. 6, 1995

Related U.S. Application Data

[62] Division of Ser. No. 73,372, Jun. 4, 1993.

[30] Foreign Application Priority Data

Jul. 19, 1992 [EP] European Pat. Off. .............. 92202260

[51] Int. Cl.$^6$ .............. H01J 29/70; H01J 01/62; H01J 63/04; H01J 03/10
[52] U.S. Cl. .............. 313/422; 313/495; 315/169.1
[58] Field of Search .............. 313/497, 422, 313/495, 496, 493, 482, 477, 238, 244, 246, 252, 257, 258, 284, 291, 292, 105 CM, 336; 345/74, 75

[56] References Cited

U.S. PATENT DOCUMENTS 5,272,410  12/1993  Fox .............................. 313/493
5,347,199   9/1994  Van Gorkom .............. 313/495

FOREIGN PATENT DOCUMENTS

0508244  1/1994  European Pat. Off. .

*Primary Examiner*—Sandra L. O'Shea
*Assistant Examiner*—Mack Haynes
*Attorney, Agent, or Firm*—Robert J. Kraus

[57] ABSTRACT

Flat-panel type picture display device having a luminescent screen and a large number of electron propagation ducts operating by means of electron wall interaction. Electrons are withdrawn from the ducts by means of an addressing system, whereafter these electrons are directed towards desired locations on the luminescent screen. An apertured spacer plate of electrically insulating material for passing electrons is arranged between the addressing system and the screen. To enable large voltage differences to be applied across the dimension of thickness of the spacer plate, the spacer plate is provided with a high-ohmic layer, or with a pattern of a low-ohmic material, or with an equalization layer at one side and with a low-ohmic layer at the other side, and at least the walls of the apertures are preferably coated with a material having a low secondary emission.

10 Claims, 6 Drawing Sheets

FLAT-PANEL TYPE PICTURE DISPLAY DEVICE WITH ELECTRON PROPAGATION DUCTS

This is a division of pending prior application Ser. No. 08/073,372, filed on Jun. 4, 1993.

BACKGROUND OF THE INVENTION

The invention relates to a picture display device having a vacuum envelope which is provided with a transparent face plate with a display screen having a pattern of luminescent picture elements (pixels), and a rear plate, said display device comprising a plurality of juxtaposed electron propagation means extending substantially parallel to the face plate, between said propagation means and the face plate, an addressing system for addressing desired pixels and an apertured spacer plate of electrically insulating material for passing electrons.

The display device described above is of the flat-panel type, as disclosed in EP-A-464 937. Display devices of the flat-panel type are devices having a transparent face plate and, arranged at a small distance therefrom, a rear plate, while the inner surface of a face plate is provided with a (for example, hexagonal) pattern of phosphor dots. If (video information-controlled) electrons impinge upon the luminescent screen, a visual image is formed which is visible via the front side of the face plate. The face plate may be flat or, if desired, curved (for example, spherical or cylindrical).

The display device described in EP-A464 937 comprises a plurality of juxtaposed sources for emitting electrons, local electron propagation means cooperating with the sources and each having walls of high-ohmic, electrically substantially insulating material having a secondary emission coefficient suitable for propagating emitted electrons, and an addressing system comprising electrodes (selection electrodes) which can be driven in rows so as to withdraw electrons from the propagation means at predetermined extraction locations facing the luminescent screen, further means being provided for directing extracted electrons towards pixels of the luminescent screen for producing a picture composed of pixels.

The operation of the picture display device disclosed in EP-A 464 937 is based on the recognition that electron propagation is possible when electrons impinge on a wall of a high-ohmic, electrically substantially insulating material (for example, glass or synthetic material), if an electric field of sufficient power is generated over a given length of the wall (by applying a potential difference across the ends of the wall). The impinging electrons generate secondary electrons by wall interaction, which electrons are attracted to a further wall section and in their turn generate secondary electrons again by wall interaction, and so forth.

Starting from the above-mentioned principle, a flat-panel picture display device can be realised by providing each one of a plurality of juxtaposed "compartments"; which constitute propagation ducts, with a column of extraction apertures at a side which is to face a display green. It will then be practical to arrange the extraction apertures along "horizontal" lines extending transversely to the ducts. By adding selection electrodes arranged in rows to the arrangement of apertures, an addressing means is provided with which electrons can be selectively withdrawn from the "compartments", which electrons can be directed (and accelerated) towards the screen for producing a picture composed of pixels by activating the pixels.

EP-A-464 937 particularly describes a multi-stage addressing or: selection system. A multi-stage selection system using a number of preselection extraction locations, which number is reduced with respect to the number of pixels, and directly or indirectly associated therewith a number of (fine-)selection apertures which corresponds to the number of luminescent pixels provides advantages with respect to, for example, the extraction efficiency and/or the required number of electrical connections/drivers. For controlling the preselection locations a pattern of preselecting electrodes is used, and for controlling the (fine) selection apertures a pattern of fine selection electrodes is used.

The luminescent screen is also referred to as the flu screen. An important component of the relevant display device is the flu spacer.

The flu spacer is located between the fine-selection electrodes and the face plate of the flu screen. Due to the efficiency and the saturation behaviour of the flu screen it is of paramount importance that the voltage between the flu screen and the fine selection electrodes is as high as possible. Dependent on the phosphors used, 3 kV or, even more frequently, 5 kV is a minimum requirement.

The fine-selection plate, the flu spacer and the flu screen are made of an insulating material, for example glass. A metallization of, for example nickel is provided in patterns on the fine-selection plate. A low-ohmic transparent conducting layer of, for example ITO is provided on the flu screen. This layer is provided with the flu screen and (possibly) a black matrix; the flu current is depleted via the conducting layer. A typical thickness of the flu spacer is 0.5–1.0 mm. The voltage difference between the fine-selection electrodes and the ITO layer on the flu screen should be as high as possible. A number of unwanted effects may occur at large voltage differences.

SUMMARY OF THE INVENTION

The invention is based on the insight that two effects can be distinguished, viz. effects which are not directly related to the "vacuum" current through the flu spacer and effects which are directly related. It is an object of the invention to provide a display device of the above described type in which the occurrence of these unwanted effects is at least partly obviated, according the invention. A display device of the type described is characterized in that the flu spacer is provided with means which enable the maintenance of large voltage differences across its width.

Depending on the effect which should be obviated the invention provides different embodiments:

1. For effects not directly related to the vacuum current:

1.1 To prevent field emission due to incorrect abutment of the flu spacer against the fine selection electrodes or the flu screen:

1.1a a high-ohmic resistance layer on the flu spacer at its electron entrance side (fine-selection side) or 1.1b filling up with an egalization layer between the adjacent (fine-) selection plate and the flu spacer or 1.1c a low-ohmic pattern on the flu spacer at its electron entrance side (fine selection side).

1.2 To prevent the flu spacer from loosening from the screen:

1.2a a relatively low-ohmic layer on the flu spacer at the electron exit side (flu side) (is also effective to suppress disturbances by external electromagnetic fields.)

2. For effects directly related to the vacuum current:

2.1 To prevent field emission:

2.1a a "low δ" coating on the apertured walls of the flu spacer and (possibly)

2.1b an adapted shape of the apertures in the flu spacer, with the apertures being tapered over at least a part of their length, or having a constriction over a part of their length.

Other Measures:

The flu spacer plate is formed as an assembly of at least two spaced sub-spacers having communicating apertures, between which sub-spacers an apertured electrically conducting plate or layer is arranged.

Note: The measures described here are primarily intended for the flu spacer but may advantageously be used for other spacers in the present display device which may have large voltage differences such as, for example the spacer adjacent to the coarse-selection electrodes, referred to as the coarse-selection spacer.

BRIEF DESCRIPTION OF THE DRAWING

These and other aspects of the invention will be described in greater detail with reference to the embodiments described hereinafter, using identical reference numerals for the same components.

DESCRIPTION OF THE PREFERRED EMBODIMENTS

Figure 1:
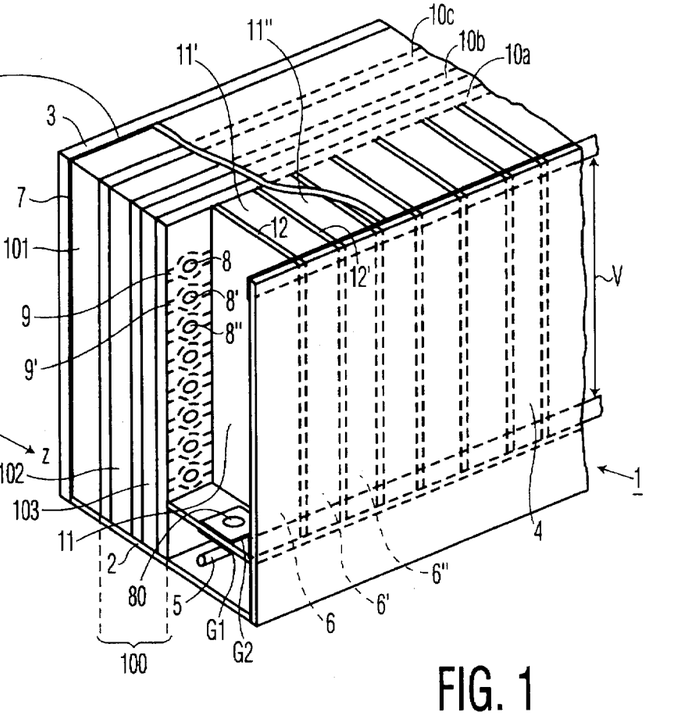
FIG. 1 is a diagrammatic perspective elevational view, partly broken away, of a pan of a (colour) display device with electron propagation ducts, an addressing system comprising an apertured preselection plate, an apertured fine-selection plate and a flu spacer whose components are not shown to scale.
Figure 1A:
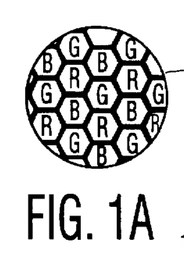
FIG. 1a shows a detail of FIG. 1.

FIG. 1 shows a flat-panel picture display device having a display panel (window) 3 and a rear wall 4 located opposite the panel. A display screen 7 having a (for example, hexagonal) pattern of red (R), green (G) and blue (B) luminescing phosphor elements is arranged on the inner surface of window 3. In the embodiment shown, triplets of phosphor elements are located in paths transverse to the long axis of the display screen (i.e. they are "vertically staggered", see inset), but the invention is not limited thereto. A "horizontally staggered" arrangement is alternatively possible.

An electron source arrangement 5, for example a line cathode which by means of electrodes provides a large number, for example 600, of electron emitters or a similar number of separate emitters, is arranged proximate to a wall 2 which interconnects panel 3 and rear wall 4. Each of these emitters is to provide a relatively small current so that many types of cathodes (cold or thermionic cathodes) are suitable as emitters. The emitters may be driven by a video drive circuit. The electron source arrangement 5 is arranged opposite entrance apertures of a row of electron propagation ducts extending substantially parallel to the screen, which ducts are constituted by compartments 6, 6', 6", . . . etc., in this case one compartment for each electron source. These compartments have cavities 11, 11', 11", . . . defined by the rear wall 4 and partitions 12, 12', . . . . The cavities 11, 11', . . . may alternatively be provided in the rear wall 4 itself. At least one wall (preferably the rear wall) of each compartment should have a high electrical resistance which is suitable for the purpose of the invention in at least the propagation direction (suitable materials are, for example ceramic material, glass, synthetic material—coated or uncoated—) and have a secondary emission coefficient δ>1 over a given range of primary electron energies. An axial propagation field is generated in the compartments by applying a potential difference $V_p$ across the height of the compartments 6, 6', 6", . . . .

The electrical resistance of the wall material has such a value that a minimum possible total mount of current (preferably less than, for example 10 mA) will flow in the walls in the case of a field strength in the axial direction in the compartments of the order of one hundred to several hundred volts per cm required for the electron propagation. By applying a voltage of the order of several dozen to several hundred volts (value of the voltage is dependent on circumstances) between the row 5 of electron sources and the compartments 6, 6', 6", electrons are accelerated from the electron sources towards the compartments, whereafter they impinge upon the walls in the compartments and generate secondary electrons.

The invention utilizes the aspect disclosed in EP-A-400 750 and EP-A-436 997 that vacuum electron propagation within compartments having walls of high-ohmic electrically substantially insulating material is possible if an electric field of sufficient power is applied in the longitudinal direction of the compartment. The contents of EP-A-400 750 and EP-A436 997 are herein incorporated by reference.

Figure 2:
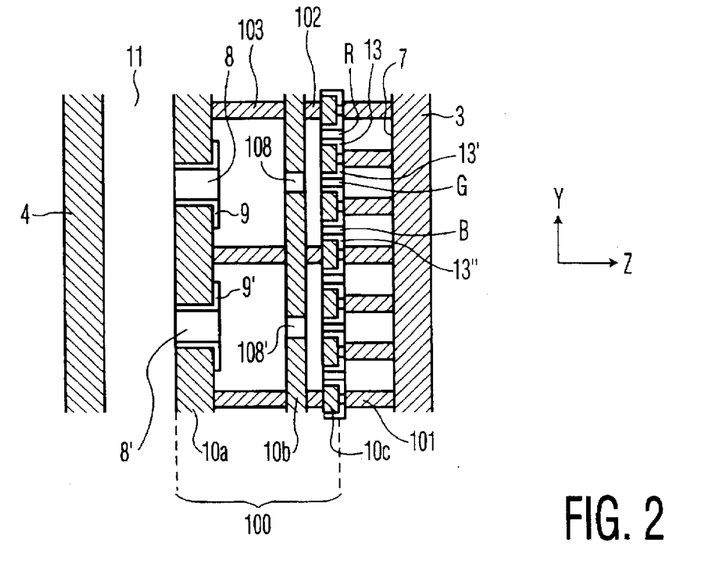
FIG. 2 is a cross-section through a part of a device of the type shown in FIG. 1.

The space between the compartments and the luminescent screen 7, which is arranged on the inner wall of panel 3, accommodates a (stepped) addressing system 100 which comprises an (active) preselection plate 10a, a (passive) anti-direct hit or obstruction plate 10b and an (active) (fine-)selection plate 10c (see also FIG. 2). Addressing system 100 is separated from the luminescent screen 7 by a flu spacer 101 in the form of an apertured plate of electrically insulating material.

FIG. 2 shows in a diagrammatical cross-section a part of the display device of FIG. 1 in greater detail, particularly the addressing system 100 which comprises preselection plate 10a with apertures 8, 8', 8", . . . , and fine-selection plate 10c with groups of apertures R, G, B. In this case three fine-selection apertures R, G, B are associated with each preselection aperture 8, 8', etc. In the diagrammatic FIG. 2 the apertures R, G, B are shown to be coplanar. However, they are actually located in a configuration corresponding to the phosphor dot pattern (see FIG. 1). In this case an obstruction plate 10b having apertures 108, 108", . . . is arranged between the preselection plate 10a and the fine-selection plate 10c, which obstruction plate prevents electrons from the propagation ducts 11 from impinging on the display screen straight through a fine-selection aperture (referred to as unwanted "direct hits").

Electron propagation ducts 6 with transport cavities 11, 11', . . . are formed between the addressing system 100 and rear wall 4. To be able to draw electrons from the ducts 6 via the apertures 8, 8', . . . , addressable metal preselection electrodes 9, 9', etc. extending from aperture to aperture and surrounding the apertures are arranged in ("horizontal") rows parallel to the long axis of the display screen on, for example the display screen side of the plate 10a.

The walls of the apertures 8, 8', . . . may be metallized.

Similarly as the plate 10a, the fine-selection plate 10c is provided with "horizontally oriented" addressable rows of (fine-)selection electrodes for realising fine selection. The possibility of directly or capacitively interconnecting corresponding rows of fine-selection electrodes is important in this respect. In fact, a preselection has already taken place and, in principle, electrons cannot land at the wrong location. This means that only one group, or a small number of groups of three separately formed fine-selection electrodes is required for this mode of fine selection.

The preselection electrodes 9, 9', . . . are subjected to a linearly increasing DC voltage, for example, by connecting them to voltage-dividing resistors. The voltage dividing resistors are connected to a voltage source in such a way that the correct potential distribution to realise electron propagation in the ducts is produced across the length of the propagation ducts. Driving is effected, for example by applying a pulse (of, for example 250 V) to consecutive preselection electrodes for a short time and to subsequently apply shorter lasting pulses of, for example 200 V to the desired fine-selection electrodes. It should of course be ensured that the line selection pulses are in synchronism with the video information. The video information is applied, for example, to the individual $G_1$ electrodes driving the emitters (FIG. 1), for example in the form of a time or amplitude-modulated signal.

It is to be noted that various modifications of the construction of the obstruction plate 10b as shown in FIG. 2 are possible. For example, the plate 10b may be combined with one or both spacer plates 102, 103. In this case the spacer plate 103 is referred to as the coarse-selection spacer and spacer plate 102 is referred to as the obstruction plate spacer or "chicane" spacer.

Figure 3:
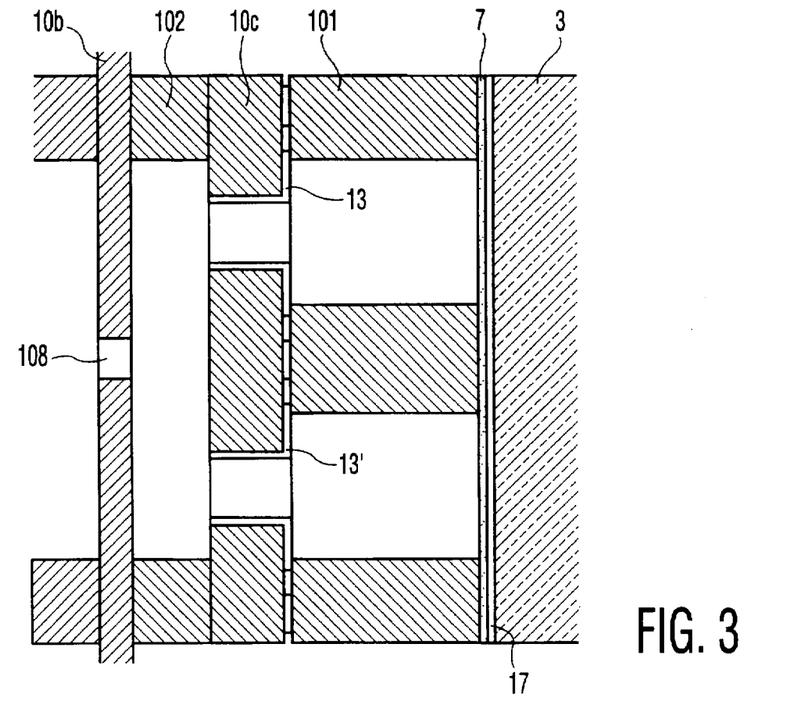
FIG. 3 shows a larger detail of FIG. 2.

If there is no (selected) electron propagation through the flu spacer 101, two phenomena are observed at large voltage differences, both of which phenomena are caused by the fact that the flu spacer does not everywhere abut correctly against the fine-selection electrodes 13, 13', 13" or against the flu screen 7. Firstly, there is field emission from the fine-selection electrodes and secondly the flu spacer may be locally detached from the screen. For the purpose of elucidation, FIG. 3 shows a larger detail of the cross-section of FIG. 2 (ideal situation).

Figure 4A:
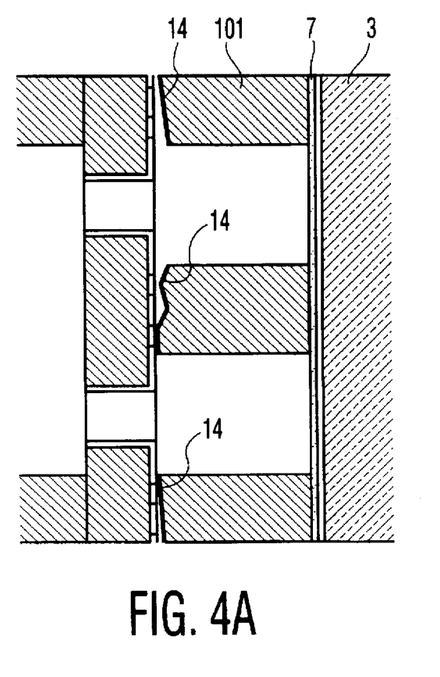
FIGS. 4–8 are cross-sectional views of different embodiments of flu spacers.

If the (flu) spacer and the fine-selection electrodes do not correctly abut at a given location due to, for example unevennesses or dust particles, and notably if this is the case over larger surfaces, the potential of the spacer proximate to the fine-selection metallization may increase considerably and may even become substantially equal to the flu voltage in extreme cases. This is caused by the resistance of the spacer material. The potential at a given point on the spacer is then determined by the voltage division across the resistance from the relevant point to the flu screen and the fine-selection electrodes. FIG. 4A shows the situation diagrammatically. Since there are small gaps between the selection electrodes and the spacer, field emission may easily be produced as a result of this effect. In practice this results in recurrent, mostly short light flashes on the flu screen. As a result of the field emission of electrons, the potential of the spacer is reduced so that the field emission is extinguished. Subsequently, it takes some time before the potential, via the resistance of the spacer material, is sufficiently high again for a subsequent short-lasting field emission. The field emission may also last a long time. This may happen when secondary electrons formed on the flu spacer as a result of a field emission can easily be propagated towards the flu screen (hopping electrons). In that case the field at the fine-selection electrodes may increase under certain circumstances in such a way that the field emission subsists.

To inhibit the field emission due to gaps, different measures can be taken. One possibility would be to impose strict requirements on the evenness of the plates, the evenness of the metallization and the prevention of contaminations such as dust, etc. A more reliable way is shown in FIG. 4A. A high-ohmic layer 14 is provided on the flu spacer 101 at the fine-selection side. This layer should have a low resistance, compared to the resistance of the flu spacer, so that the lower side of the flu spacer is maintained at the voltage of the fine-selection electrodes on the one hand (this determines the upper limit of the resistance) and, compared with the selection electrodes, is very high ohmic on the other hand (this determines the lower limit). The spacer now only needs to abut the fine-selection electrodes point by point, without gaps causing field emission. The layer 14 should be sufficiently high ohmic to avoid "short circuits" between the different selection electrodes. (interconnection of the fine selection electrodes by the layer 14 resulting from). In the case of a 26" display and for a flu spacer of window glass having a resistivity of approximately $5*10^{12}$ $\Omega$cm, the resistance per square of the layer should roughly be in the range between $10^{10}$ and $10^{11}$ $\Omega$. A layer having such a resistance per square can be made in different manners. In one embodiment use is made of a layer comprising coloidal particles of $Sb_2O_3$-$SnO_2$. An $In_2O_3$ layer is alternatively possible..

Figure 4B:
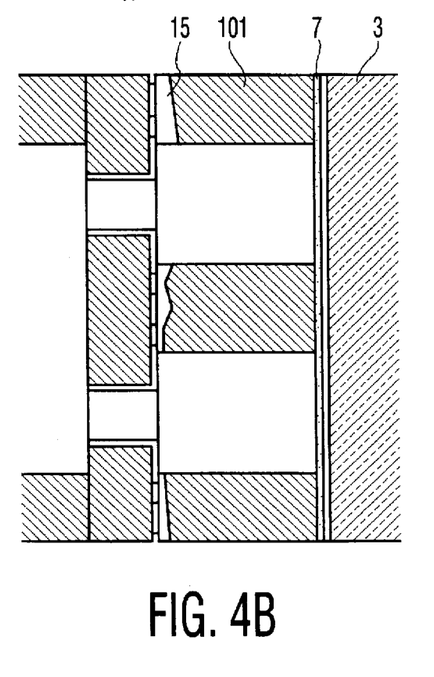

A second manner of preventing field emission due to gaps is to fill up the space between the spacer 101 and the fine selection with a layer 15 of a very high ohmic or (substantially) insulating material so that a satisfactory contact is always established. This is shown in FIG. 4B. The required resistivity of the "filling" depends on the size of the gaps and on the resistivity of the spacer material. The voltage at the lower side of the spacer should be sufficiently close to that of the selection electrodes. During tests use was made of a polyimide intermediate layer.

A third way of preventing field emission is to provide a low-ohmic layer (for example metallization) in patterns on the fine-selection side of the spacer 101. If this pattern is chosen to be equal to that of the fine selection electrodes, mere will be no short circuits and the potential of the spacer at the fine-selection side is nevertheless defined. This solution is more expensive than, for example the use of only a high-ohmic layer. As regards dissipated power, a conductor provided in patterns is more favourable than a high-ohmic layer.

Figure 5:
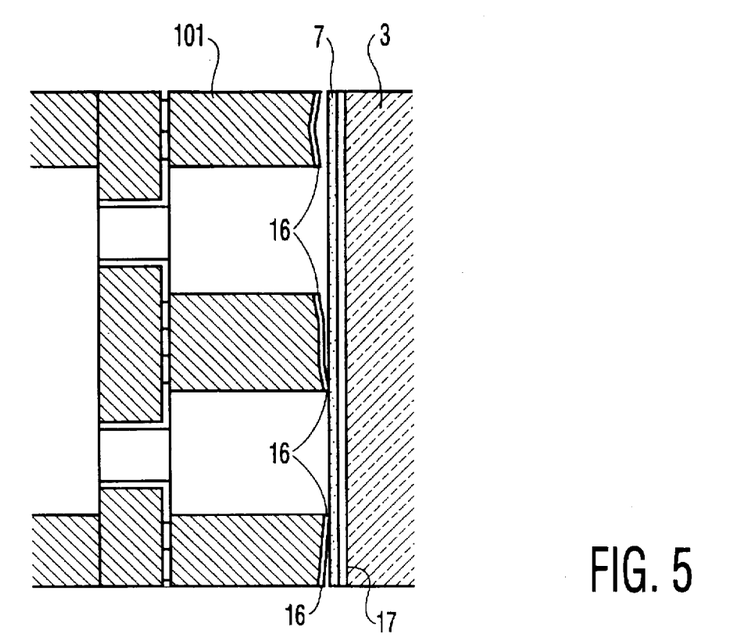

If the flu spacer 101 does not correctly abut against the flu screen 7, relatively large voltage differences between the spacer and the screen may occur locally, as is also the case when there are gaps at the fine selection plate. This is shown in FIG. 5. Apart from unevennesses and dust particles, the contact between spacer and screen is poorly defined due to the flu screen powder or the black matrix present on the ITO layer 17. In practice this means that without any measures the flu powder (and/or the black matrix) may be detached from the ITO lower layer at high flu voltages and may be drawn towards the spacer; the extent to which this happens is dependent on the adhesion for the powder to the screen. A simple measure of preventing this is to provide a resistive layer 16 at the screen side of the flu spacer. In contrast to the layer at the fine-selection side, this layer should be relatively low ohmic. One possibility is to choose the layer to be so low ohmic that contact via the outer edges of the plate (at the edge of the display) is sufficient to define the potential.

Example: for a 26" display with a 0.5 mm thick flu spacer having a resistivity of $5 \times 10^{12}$ Ω and at a flu voltage of 10 kV, the resistive layer should have a resistance per square which is smaller than approximately $10^5$ Ω so as to cause the voltage difference (as a result of voltage division only) with the flu screen to be less than approximately 10 V throughout. The voltage difference allowed is dependent on the adhesion of the flu or the black matrix and on the size of the gaps. The value of 10 V is an example. The resistance per square of this layer is preferably chosen to be very much smaller than the above-mentioned $10^5$ Ω. For example, a metal layer (for example Ni) or a low-ohmic ITO layer are suitable. Moreover, this layer may be utilized for shielding the display from electromagnetic disturbance (EMS), which is a significant advantage.

Figure 6:
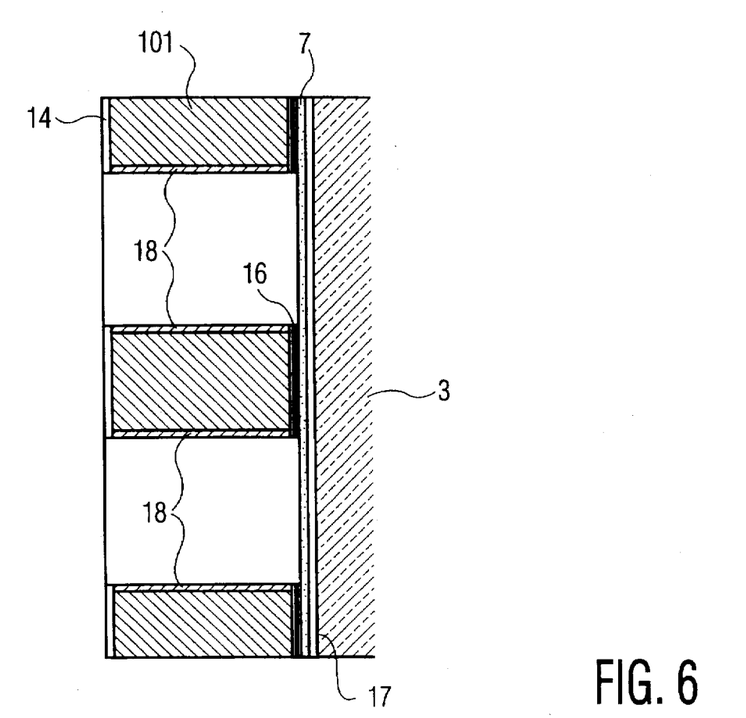

If electrons are passed through the apertures in the fine-selection electrodes 13, 13', 13", . . . , the walls of the flu spacer will be charged. This charging is predominantly effected by electrons which are backscattered from the flu screen and generate secondary electrons on the spacer walls, which electrons are in their turn transported towards the flu sreen. It appears to be favourable to ensure that the walls of the flu spacers are poor secondary emitters, either by choosing suitable spacer material or by providing a suitable coating; the latter seems to be the easiest way. As far as suppression of field emission is concerned, the ideal case is that the secondary emission coefficient δ is always smaller than 1. It will be evident that in connection with the previously mentioned effects, said coating should preferably be sufficiently high ohmic so that the fine-selection side of the flu spacer is not "short-circuited" with the screen side. FIG. 6 shows where the different coatings should be provided. The "low δ" coating 18 described may be provided throughout the spacer 101, for example on coatings 14 and 16; in practice, this is often simpler than providing the coating on the walls of the apertures only.

As regards the "low δ" coating, experience has been gained with organic layers. Satisfactory results were achieved, for example with polyimide coatings. For an improved constant high voltage in the absence of vacuum current, inorganic low δ coatings may alternatively be used.

The electric field at the fine-selection electrodes and hence unwanted field emission can be decreased by suitable choice of the shape of the flu spacer apertures. Rough directives for reducing the field at the selection electrodes are:

1. At a given thickness of the flu spacer the diameter of the apertures should be chosen to be as large as possible, at least at the fine-selection side. The scale of the field at the selection electrodes is roughly inversely proportional to the diameter (at the fine-selection side).
2. It is favourable to give the apertures in at/area adjacent to the fine selection a conical shape so that, viewed from the selection electrodes to the flu screen, the diameter of the aperture will be smaller.

In addition to the criteria emanating from the wish to minimize the electric field at the fine-selection electrodes, there are two preconditions which should be taken into account as much as possible:

3. The apertures at the screen side should have a maximum possible diameter so as to obtain a maximum possible spot on the flu screen (to prevent possible saturation effects) and landing reserve (to prevent electrons to from hitting the aperture walls.)
4. The aperture diameter at the fine-selection side should be preferably so small that the peripheral areas of the fine-selection metallization pattern are covered by the flu spacer structure (see FIG. 3). It is empirically apparent that, if this is not the case, field emission can easily occur from the edges of the metallization. The metallization around the apertures in the fine-selection plate at the flu side is limited in size by the mutual distances between the apertures and the metallization tracks.

Figure 7A:
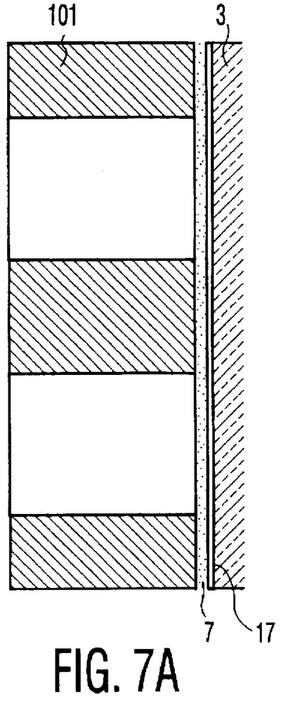
Figure 7B:
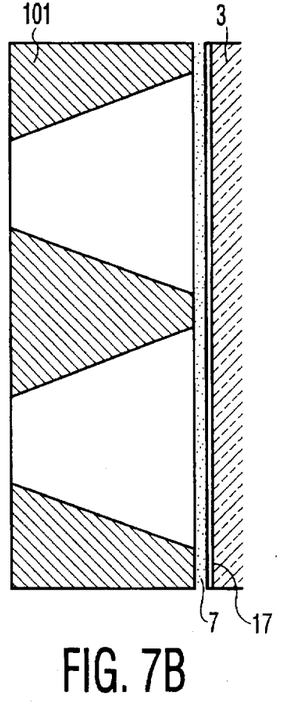
Figure 7C:
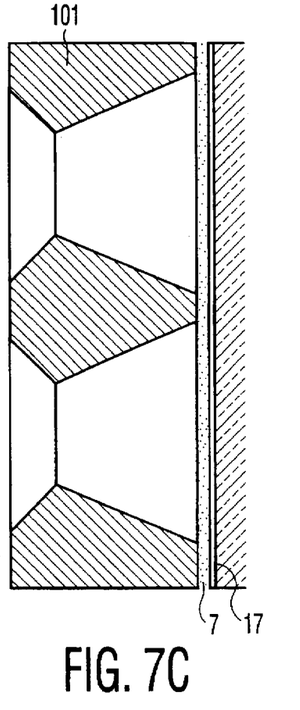

Aperture shapes with which these requirements can be met are shown in FIG. 7A (cylindrical apertures having a diameter of approximately 0.4 mm), FIG. 7B (conical apertures widening towards the flu screen) and FIG. 7C (diabolo-shaped apertures, i.e. apertures which become narrower from both ends towards the centre.)

Many experiments relating to a constant voltage were performed on the geometry as shown in FIG. 7B; this geometry can be easily realised and the fine-selection metallization terminates amply below the spacer material (window glass). Typical dimensions are: thickness 0.5 mm, diameter aperture fine-selection side 0.3 mm, diameter aperture flu side 0.5 mm. Flu voltages of more than 10 kV can be achieved with such a flu spacer which is coated at the fine-selection side with a high-ohmic ATO layer (see above) and at the flu side with, for example nickel and in which a thin polyimide coating is provided on the assembly. Use is made of a fine-selection plate of glass provided with a 2 μm nickel coating.

Figure 8:
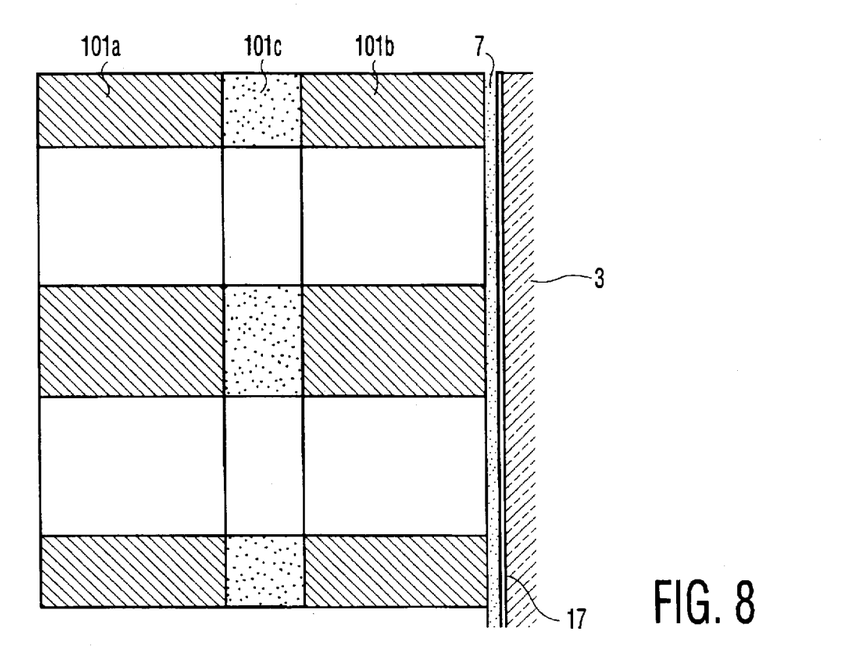

A method of further increasing the voltage between the fine-selection electrodes is to make use of two (or more) sub-spacers 101a, 101b in cascade, with a metal plate 101c (or metallized plate or a plate rendered conducting in another manner) provided with coaxial apertures being interposed. Such a double spacer is shown diagrammatically in FIG. 8. The high voltage can how be distributed over the two spacers. The conducting partition is used to define the potential in the middle and for this reason it should not be chosen to be arbitrarily thin in the embodiment shown. For two spacers having a thickness of 0.5 mm and an aperture diameter of 0.4 mm, a thickness of 0.1–0.2 mm of the partition is a suitable value. The geometry of the separate spacers may be freely chosen within given limits (see above) so as to achieve an optimum voltage consistency. (The conducting partition may be replaced by a conducting layer provided on one of the spacers.) To define the potential, both spacers should be provided with conducting layers at the flu screen side as well as at the fine-selection side. The conducting layer at the fine-selection side of the spacer 101a should be high ohmic. Both spacers should be preferably coated with a low δ coating.

In the foregoing the addressing system of the display device has been described in relation to two steps. However, the addressing system may be used to equal advantage with more than two steps. In some applications the addressing system may be single-stepped.

It is to be noted that the length of the electron propagation ducts or the quantity of juxtaposed propagation ducts is principally unimportant for the picture quality. Any aspect ratio for a display screen having a short axis and a long axis is thus possible, for example 4:3; 14:9; 16:9. The electron propagation ducts are generally arranged parallel to the short axis of the display screen, but in some cases it my be advantageous if they are arranged parallel to the long axis. A preselection aperture may be associated with, for example 2 fine-selection apertures (selection in groups of two), 3 fine-selection apertures (selection in groups of three), 4 fine-selection apertures (selection in groups of four), 6 fine-selection apertures (selection in groups of six). FIG. 2 shows the situation where three fine-selection apertures "R", "G" and "B" are associated with a preselection aperture 9.

There are various possibilities for the arrangement of the three fine-selection apertures.

Figure 9:
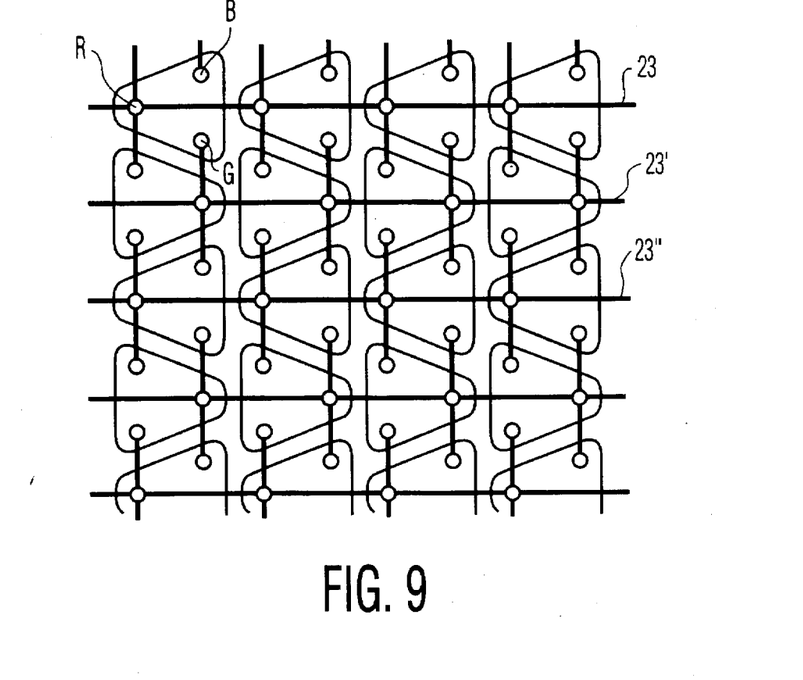
FIGS. 9–11 are elevationat views of three fine-selection plates with different fine-selection electrode arrangements.
Figure 10:
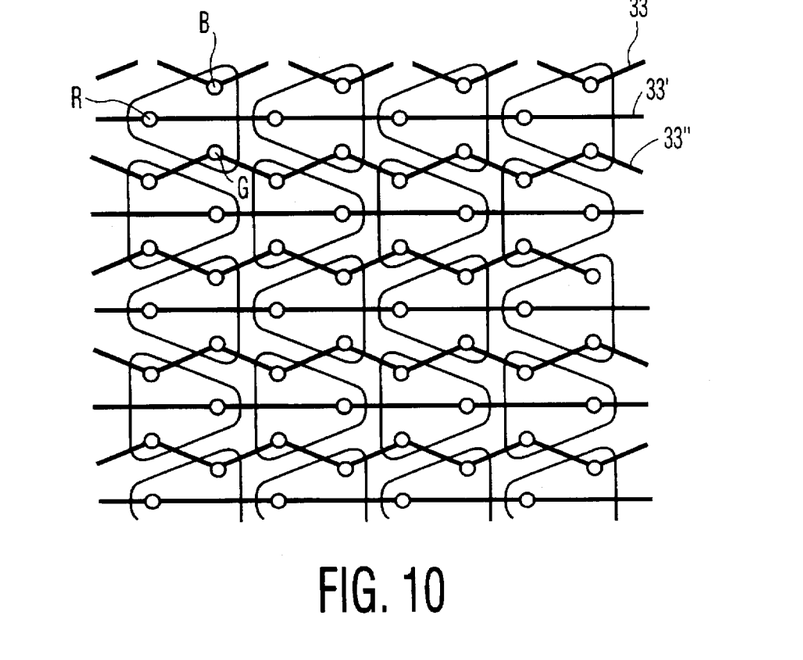
Figure 11:
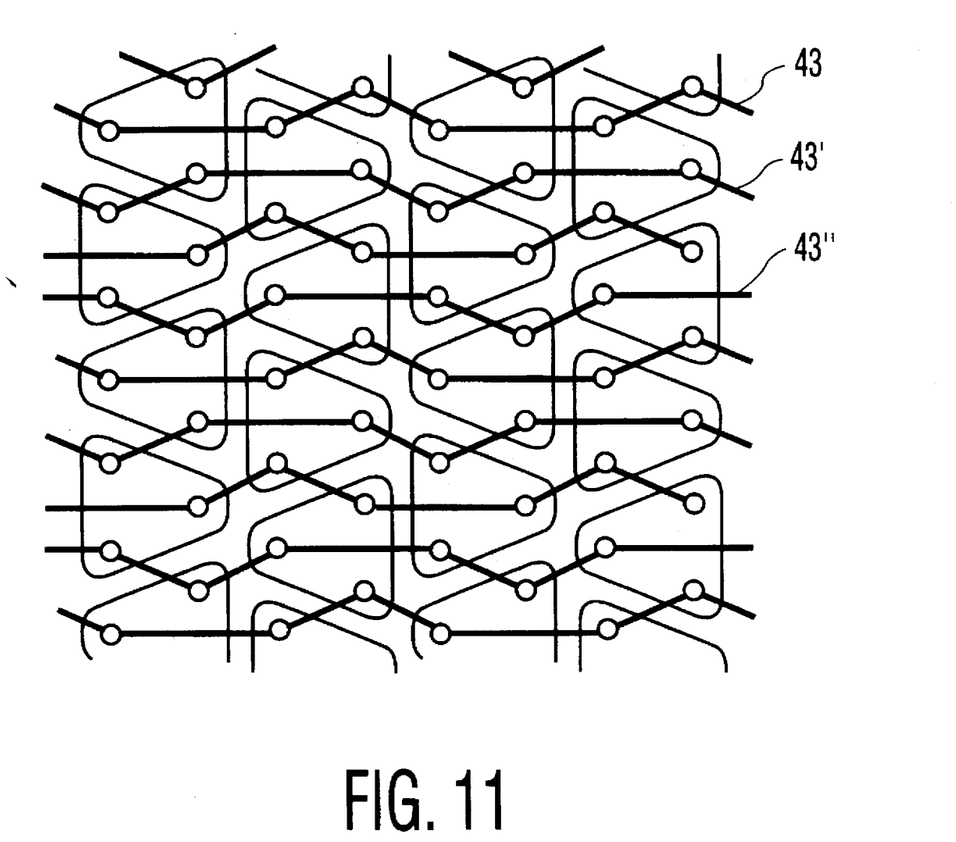

For the display effect it is advantageous to use a fine selection arrangement of triplets (symmetry between the 3 apertures). FIG. 1 shows a R,B,G colour dot structure arranged along vertical paths. It will be evident that it will be "horizontally" arranged fine-selection electrodes or "tracks" 13, 13', 13", ... for interconnecting dots of the same colour, as shown in FIG. 2. The idea that a track may also interconnect different colours leads to a series of novel possibilities. The basic principle of the following arrangements is a track through the centre of each triplet, with the remaining two dots being driven by a superjacent and a subjacent track, respectively. The central track may lead to negative charging during switch-off, but since the access aperture in the obstruction plate is located right opposite this track, this has no serious consequences for addressing the other two apertures. FIGS. 9, 10 and 11 show some elaborations of this idea in a structure using vertical dot paths. In all these cases a straightforward solution, with horizontal tracks between equal colours, is alternatively possible. However in FIG. 9 the number of horizontal tracks 23, 23', 23", ... per height of the display is 3 times smaller than in the straightforward solution, and also in FIGS. 10 and 11 it is substantially smaller than in the straight forward solution, with the inherent advantages. In FIG. 11 the even and odd columns of triplets are slightly offset with respect to each other, which is an attractive feature for the effect and for the coarse-selection track pattern in a column-multiplexed display.

We claim:

1. A flat panel display device comprising:
   a. a face plate bearing a luminescent screen;
   b. a back plate;
   c. means connecting the back plate to the face plate to form a sealed enclosure;
   d. means for producing electrons;
   e. a spacer structure, including a plurality of apertures for passing the electrons to the screen, situated within the enclosure between the back plate and the face plate, said structure including an apertured spacer plate having walls defining respective apertures in said plate, at least a first portion of each of said walls diverging with distance toward the face plate.

2. A flat panel display device comprising:
   a. a face plate bearing a luminescent screen;
   b. a back plate;
   c. means connecting the back plate to the face plate to form a sealed enclosure;
   d. means for producing electrons;
   e. a selection structure, including a plurality of apertured plates, situated within the enclosure between the back plate and the face plate and having means for establishing a predetermined potential gradient for effecting propagation of the electrons through selected ones of the apertures and toward the screen, one of said apertured plates comprising a spacer plate having walls defining respective apertures in said plate, at least a first portion of each of said walls diverging with distance toward the face plate.

3. A flat panel display device as in claim 1 or 2 where the spacer plate is disposed adjacent the face plate.

4. A flat panel display device as in claim 1 or 2 where each of said walls also includes a second portion which diverges with distance toward the back plate.

5. A flat panel display device as in claim 1 or 2 where said first wall portions have a conical shape.

6. A flat panel display device as in claim 4 where said first and second wall portions have a conical shape.

7. A flat panel display device as in claim 4 where the spacer plate has a thickness of approximately 0.5 mm, where the first wall portions each have a maximum diameter of approximately 0.5 mm, and where the second wall portions each have a maximum diameter of approximately 0.3 mm.

8. A flat panel display device as in claim 4 where each of the first wall portions comprises a low resistivity coating and where each of the second wall portions comprises a high resistance coating.

9. A flat panel display device comprising a luminescent screen and means for selectively energizing predetermined areas of said screen, said means comprising:
   a. an arrangement of electron transport ducts, each having a plurality of exit apertures;
   b. means for promoting propagation of electrons within the ducts by recurrent electron interactions with secondary emission material;
   c. selection means for selectively extracting electrons from the exit apertures and including a selection plate of insulating material having a multiplicity of apertures for passing extracted electrons and bearing electrodes arranged in a predefined pattern on a side of the plate facing the screen, said electrodes having respective peripheral edges spaced from edges of the apertures;
   d. an apertured spacer plate disposed between the selection plate and the screen and including apertures in communication with respective ones of the selection plate apertures, said spacer plate apertures being sufficiently small, at least adjacent the selection plate apertures, such that said peripheral edges of said electrodes are covered by solid portions of said spacer plate.

10. A flat panel display device as in claim 9 where the spacer plate apertures have cylindrical shapes.

* * * * *